United States Patent
Pasio

(10) Patent No.: US 11,522,801 B2
(45) Date of Patent: Dec. 6, 2022

(54) REDUCING PACKET DELAY VARIATION OF TIME-SENSITIVE PACKETS

(71) Applicant: TELEFONAKTIEBOLAGET LM ERICSSON (PUBL), Stockholm (SE)

(72) Inventor: Francesco Pasio, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/486,947

(22) PCT Filed: Mar. 2, 2017

(86) PCT No.: PCT/EP2017/054888
§ 371 (c)(1),
(2) Date: Aug. 19, 2019

(87) PCT Pub. No.: WO2018/157932
PCT Pub. Date: Sep. 7, 2018

(65) Prior Publication Data
US 2020/0389407 A1 Dec. 10, 2020

(51) Int. Cl.
*H04L 47/283* (2022.01)
*H04L 45/00* (2022.01)
(Continued)

(52) U.S. Cl.
CPC ........... *H04L 47/283* (2013.01); *H04L 45/20* (2013.01); *H04W 28/0236* (2013.01); *H04W 28/12* (2013.01)

(58) Field of Classification Search
CPC .................................................. H04L 47/283
See application file for complete search history.

(56) References Cited

U.S. PATENT DOCUMENTS

| 8,064,484 B2 | 11/2011 | Zampetti |
| 2005/0044211 A1* | 2/2005 | Adhikari ............. H04L 69/40 709/224 |

(Continued)

FOREIGN PATENT DOCUMENTS

| CN | 101416431 A | 4/2009 |
| CN | 101510840 A | 8/2009 |

(Continued)

OTHER PUBLICATIONS

IEEE, "IEEE Standard for a Precision Clock Synchronization Protocol for Networked Measurement and Control Systems", IEEE Instrumentation and Measurement Society, IEEE Std 1588—2008, Jul. 24, 2008.

(Continued)

*Primary Examiner* — Ivan O Latorre
*Assistant Examiner* — Won Tae C Kim
(74) *Attorney, Agent, or Firm* — Patent Portfolio Builders PLLC

(57) ABSTRACT

A first node provides a time function to a second node. The first node generates a time function protocol data unit required for supporting the time function and generates a plurality of preamble protocol data units. The plurality of preamble protocol data units are sent before the time function protocol data unit. The preamble protocol data units carry routing information to cause the preamble protocol data units to follow a same network path as the time function protocol data unit. At an intermediate node the plurality of preamble protocol data units, the time function protocol data unit and other data traffic are stored in queues of different priority level. The intermediate node controls a time order of forwarding based on priority levels of the queues.

24 Claims, 9 Drawing Sheets

(51) Int. Cl.
*H04W 28/02* (2009.01)
*H04W 28/12* (2009.01)

(56) References Cited

U.S. PATENT DOCUMENTS

| | | | | |
|---|---|---|---|---|
| 2007/0097264 | A1* | 5/2007 | Risk | H04L 7/0083 348/552 |
| 2012/0195253 | A1* | 8/2012 | Irvine | H04W 56/0015 370/328 |
| 2012/0207178 | A1* | 8/2012 | Webb, III | H04L 47/365 370/429 |
| 2013/0077509 | A1* | 3/2013 | Hirota | H04L 43/106 370/252 |
| 2014/0064297 | A1* | 3/2014 | Hirota | H04J 3/0635 370/412 |
| 2014/0177653 | A1 | 6/2014 | Tzeng | |
| 2014/0362868 | A1* | 12/2014 | Hirota | H04L 47/32 370/412 |
| 2016/0142291 | A1* | 5/2016 | Polland | H04L 45/745 370/392 |

FOREIGN PATENT DOCUMENTS

| | | |
|---|---|---|
| WO | 2016070901 A1 | 5/2016 |
| WO | 2017012635 A1 | 1/2017 |

OTHER PUBLICATIONS

International Telecommunication Union, ITU-T, G.8275.2/Y.1369. 2, "Series G: Transmission Systems and Media, Digital Systems and Networks; Packet over Transport aspects—Synchronization, quality and availability targets; Series Y: Global Information Infrastructure, Internet Protocol Aspects and Next-Generation Networks, Internet of Things and Smart Cities; Precision time protocol telecom profile for phase/time synchronization with partial timing support from the network", Jun. 2016.

International Search Report and Written Opinion, dated Nov. 21, 2017, from corresponding/related International Application No. PCT/EP2017/054888.

Office Action/Search Report in corresponding/related Chinese Application No. 201780090320.2 dated Jul. 4, 2022.

* cited by examiner

REDUCING PACKET DELAY VARIATION OF TIME-SENSITIVE PACKETS

TECHNICAL FIELD

The present disclosure is generally related to networks which provide a time function, such as for synchronisation purposes.

BACKGROUND

There is an increasing demand for accurate synchronisation between network equipment, such as wireless base stations.

One solution to achieve synchronisation is to provide a Global Navigation Satellite System (GNSS) receiver, such as a Global Positioning System (GPS) receiver, at a node requiring synchronisation. However, there are some locations where a GNSS receiver cannot reliably receive a set of signals necessary to compute an accurate time reference. GNSS can also suffer from temporary outages due to weather conditions or unintentional/intentional radio frequency jamming.

In view of the above drawbacks of relying on GNSS, it is desirable that a backhaul network connected to the base station has the capability of delivering signals for synchronisation purposes.

One known way of supporting synchronisation is the Precision Time Protocol (PTP), IEEE 1588v2. In PTP, one node is designated as a master and another node is designated as a slave. The master and slave exchange time-stamped messages. The timestamps allow the slave to obtain a good estimation of the time offset between itself and the master. By knowing this offset, the slave can synchronise itself with the master.

PTP uses event messages sent in a forward direction (master to slave) and reverse direction (slave to master). The PTP event messages are time-sensitive. This is because PTP computes a difference between a time of transmission of a PTP event message by one of the PTP nodes (e.g. master) and a time of receipt of the message by another of the PTP nodes (e.g. slave). An accuracy of the propagation time directly affects the accuracy of the clock recovered by the slave. There are factors which can cause a variation in the measured delay in one direction (e.g. master to slave) over a period of time. Ideally, the delay in the forward and reverse directions is equal, i.e. a symmetric delay. However, there are various factors which can cause an asymmetric delay. Traffic load on the network can cause an asymmetric delay. Both of these factors impair the accuracy of the time which can be recovered, and therefore impair the accuracy of synchronisation between the master and the slave.

SUMMARY

An aspect provides a method of operating a first node of a network to provide a time function in the network. The method comprises, at the first node, generating a time function protocol data unit for supporting the time function. The method comprises, at the first node, generating a plurality of preamble protocol data units. The method comprises, at the first node, sending the plurality of preamble protocol data units before sending the time function protocol data unit. The preamble protocol data units carry routing information to cause the preamble protocol data units to follow a same network path as the time function protocol data unit.

Optionally, the time function protocol data unit carries information configured to indicate to another node of the network that the time function protocol data unit is to be forwarded before the preamble protocol data unit.

Optionally, the preamble protocol data units carry information configured to indicate to another node of the network that the preamble protocol data units are to be forwarded before other data traffic.

The information carried by the time function protocol data unit and/or the preamble protocol data units can be indicative of a priority level. Additionally, or alternatively, the information carried by the time function protocol data unit and/or the preamble protocol data units can be indicative of a message type, and another node can use the information to forward the protocol data unit.

Optionally, the preamble protocol data units carry priority information which indicates a priority level, wherein a priority level of the preamble protocol data units is below the priority level of the time function protocol data unit.

Optionally, the preamble protocol data units carry priority information which indicates a priority level which is immediately below a priority level of the time function protocol data unit.

Optionally, a priority level of the time function protocol data unit and a priority level of the preamble protocol data unit are higher than a priority level of other data traffic in the network.

Optionally, the network permits a maximum protocol data unit size and the preamble protocol data unit has a length which is less than 5% of the maximum protocol data unit size, and optionally less than 1% of the maximum protocol data unit size.

Optionally, the preamble protocol data unit has a length which is a minimum protocol data unit size permitted in the network.

Optionally, the network supports a maximum protocol data unit size and a combined length of the sequence of preamble protocol data units is equal to, or longer than, a maximum protocol data unit size allowed in the network.

Optionally, the method comprises determining when the time function protocol data unit is waiting in a queue at the node. The method comprises generating the sequence of preamble protocol data units and inserting the sequence of preamble protocol data units into the transmission queue before the time function protocol data unit.

Optionally, the time function protocol data unit is destined for a second node, and the generating comprises generating a number of preamble protocol data units based on a number N of intermediate nodes to be traversed between the first node and the second node.

Optionally, the generating comprises generating a number of preamble protocol data units such that a combined length of the sequence of preamble protocol data units is equal to, or greater than, a length of N times the maximum protocol data unit size allowed in the network.

Optionally, the method comprises recording a timestamp of a transmission time of the time function protocol data unit and sending the timestamp in a subsequent time function protocol data unit.

Optionally, the time function protocol data unit carries an event message of a synchronisation protocol using a two-way exchange of messages.

Optionally, the time function is one of: Precision Time Protocol; Network Time Protocol.

Optionally, the time function protocol data unit carries a Precision Time Protocol Synch message or a Precision Time Protocol Delay_Request message.

Optionally, the method comprises, at an intermediate node along the network path, receiving the plurality of preamble protocol data units and storing the plurality of preamble protocol data units in a second queue having a second priority level. The method comprises, at the intermediate node, receiving the time function protocol data unit and storing the time function protocol data unit in a first queue having a first priority level which is higher than the second priority level. The plurality of preamble protocol data units are received before the time function protocol data unit. The method comprises, at the intermediate node, controlling a time order of forwarding queued protocol data units based on the priority levels of the queues.

Optionally, the controlling a time order of forwarding comprises forwarding the queued time function protocol data unit before forwarding any remaining queued preamble protocol data units.

Optionally, the method comprises receiving a data traffic protocol data unit carrying data traffic and storing the data traffic protocol data unit in a third queue having a third priority level which is lower than the second priority level. The controlling a time order of forwarding comprises: forwarding the queued preamble protocol data units before forwarding the queued data traffic protocol data unit; and forwarding the time function protocol data unit before forwarding any remaining queued preamble protocol data units.

Optionally, the intermediate node allocates a protocol data unit to a queue according to at least one of: priority information carried by the protocol data unit; an indicator of a message type.

Another aspect provides a method of operating an intermediate node in a network comprising a first node which provides a time function and a second node which uses the time function. The method comprises receiving a plurality of preamble protocol data units and storing the plurality of preamble protocol data units in a second queue having a second priority level. The method comprises receiving a time function protocol data unit for supporting a time function and storing the time function protocol data unit in a first queue having a first priority level which is higher than the second priority level.

The plurality of preamble protocol data units are received before the time function protocol data unit. The preamble protocol data units carry routing information to cause the preamble protocol data units to follow a same network path as the time function protocol data unit. The method comprises controlling a time order of forwarding queued protocol data units based on the priority levels of the queues.

Optionally, the controlling a time order of forwarding comprises forwarding the queued time function protocol data unit before forwarding any remaining queued preamble protocol data units.

Optionally, the method comprises receiving a data traffic protocol data unit carrying data traffic, and storing the data traffic protocol data unit in a third queue having a third priority level which is lower than the second priority level. The controlling a time order of forwarding comprises: forwarding the preamble protocol data units before forwarding the queued data traffic protocol data unit; and forwarding the time function protocol data unit before forwarding any remaining queued preamble protocol data units.

Another aspect provides apparatus for supporting a time function in a network. The apparatus is configured to generate a time function protocol data unit for supporting the time function. The apparatus is configured to generate a plurality of preamble protocol data units. The apparatus is configured to send the plurality of preamble protocol data units before sending the time function protocol data unit. The preamble protocol data units carry routing information to cause the preamble protocol data units to follow a same network path as the time function protocol data unit.

Another aspect provides apparatus for use at an intermediate node in a network comprising a first node which provides a time function and a second node which uses the time function. The apparatus is configured to receive a plurality of preamble protocol data units and store the plurality of preamble protocol data units in a second queue having a second priority level. The apparatus is configured to receive a time function protocol data unit for supporting a time function and store the time function protocol data unit in a first queue having a first priority level which is higher than the second priority level. The plurality of preamble protocol data units are received before the time function protocol data unit. The preamble protocol data units carry routing information to cause the preamble protocol data units to follow a same network path as the time function protocol data unit. The apparatus is configured to control a time order of forwarding queued protocol data units based on the priority levels of the queues.

Another aspect provides a system comprising a first node for supporting a time function in a network and a first clock. The system comprises a second node comprising a second clock. The system comprises a network connecting the first node to the second node. The network comprises at least one intermediate node. The second node is configured to receive the time function protocol data unit and to use the time function protocol data unit to determine a time offset between a clock at the second node and a clock at the first node. The second node is configured to synchronise the second clock with the first clock.

Optionally, the network is a wireless backhaul network and the second node is a wireless base station.

Another aspect provides apparatus for supporting a time function in a network, the apparatus comprising a processor and a memory. The memory contains instructions that when executed by the processor cause the processor to generate a time function protocol data unit for supporting the time function. The instructions cause the processor to generate a plurality of preamble protocol data units. The instructions cause the processor to control sending the plurality of preamble protocol data units before sending the time function protocol data unit. The preamble protocol data units carry routing information to cause the preamble protocol data units to follow a same network path as the time function protocol data unit.

Another aspect provides apparatus for use at an intermediate node in a network comprising a first node which provides a time function and a second node which uses the time function. The apparatus comprises a processor and a memory. The memory contains instructions that when executed by the processor cause the processor to receive a plurality of preamble protocol data units and store the plurality of preamble protocol data units in a second queue having a second priority level. The instructions cause the processor to receive a time function protocol data unit for supporting a time function and store the time function protocol data unit in a first queue having a first priority level which is higher than the second priority level. The plurality of preamble protocol data units are received before the time function protocol data unit. The preamble protocol data units carry routing information to cause the preamble protocol data units to follow a same network path as the time function protocol data unit. The instructions cause the processor to control a time order of forwarding queued protocol data units based on the priority levels of the queues.

Another aspect provides apparatus for supporting a time function in a network. The apparatus comprises a first generation module configured to generate a time function protocol data unit required for supporting the time function. The apparatus comprises a second generation module configured to generate a sequence of preamble protocol data units. The apparatus comprises an output module configured to send the sequence of preamble protocol data units before sending the time function protocol data unit. The preamble protocol data units carry routing information to cause the preamble protocol data units to follow the same network path as the time function protocol data unit.

Another aspect provides apparatus for use at an intermediate node in a network comprising a first node which provides a time function and a second node which uses the time function. The apparatus comprises an input module configured to receive a plurality of preamble protocol data units and to receive a time function protocol data unit required for supporting a time function. The apparatus comprises a control module configured to store the plurality of preamble protocol data units in a second queue having a second priority level and to store the time function protocol data unit in a first queue having a first priority level which is higher than the second priority level. The plurality of preamble protocol data units are received before the time function protocol data unit. The preamble protocol data units carry routing information to cause the preamble protocol data units to follow a same network path as the time function protocol data unit. The control module is configured to control a time order of forwarding queued protocol data units based on the priority levels of the queues.

An advantage of at least one example of this disclosure is reducing Packet Delay Variation (PDV) experienced by time function PDUs, such as PTP event messages, when crossing intermediate nodes. This can improve the accuracy of a recovered clock, and therefore improve accuracy of synchronisation between network nodes, such as wireless base stations.

An advantage of at least one example of this disclosure, when applied to a two-way time function such as PTP, is a reduction in the difference in PDV between forward and reverse directions.

An advantage of at least one example of this disclosure is allowing a time function to be provided to a slave node with a longer chain of intermediate nodes.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
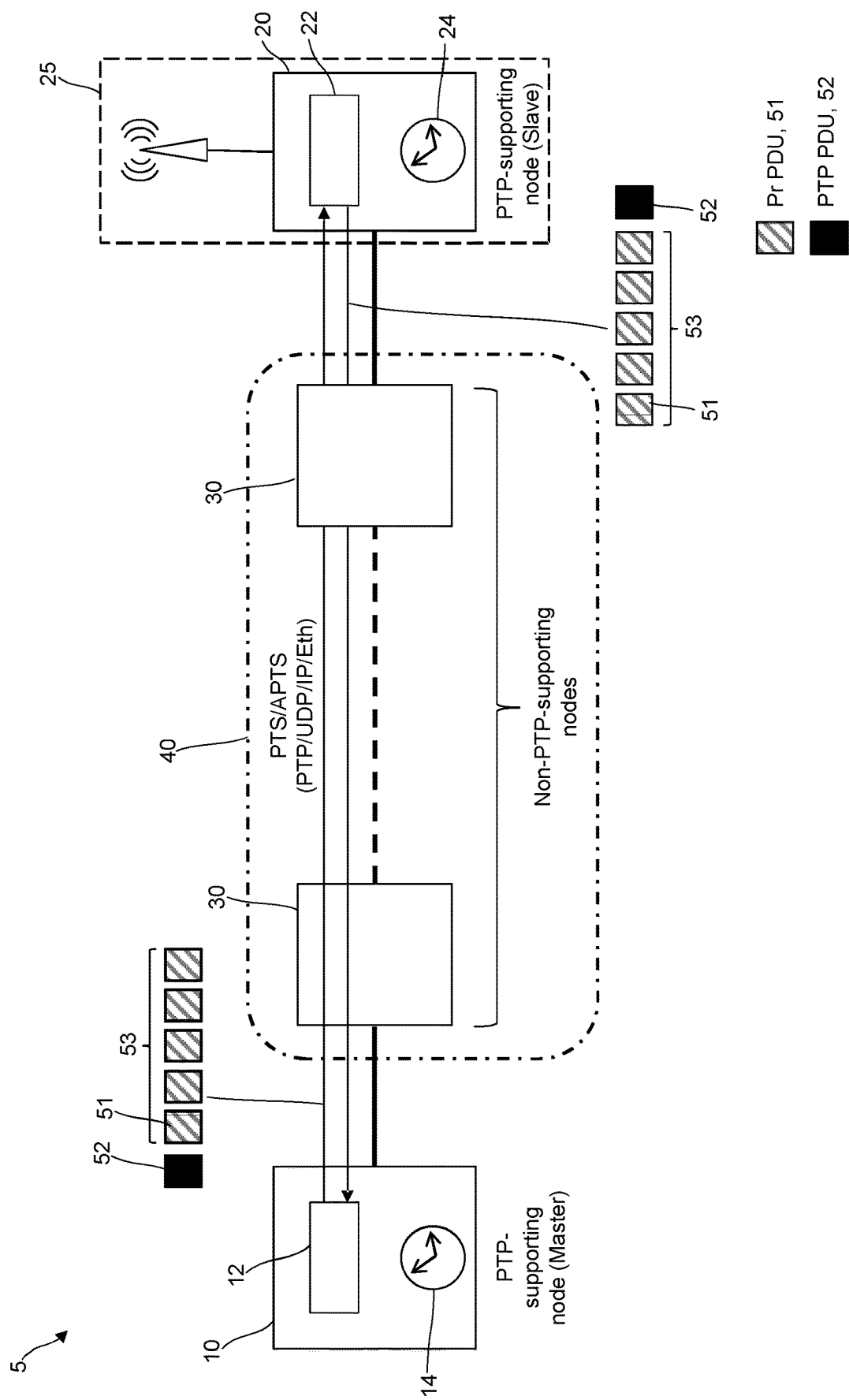
FIG. 1 shows an example of a network which provides a time function using time function PDUs.

FIG. 1 shows an example communication system 5 with nodes 10, 20 connected by a network 40. Node 20 may be part of, or be connected to, a wireless base station 25 or any other type of equipment which needs to be synchronised in one or more of: time, phase and frequency. Node 20 has a clock 24. Node 20 is configured to synchronise the clock 24 with a clock 14 at node 10. In this system, node 10 is a "master" and node 20 is a "slave".

Network 40 comprises nodes 30. These will be called "intermediate nodes" as they are between the nodes 10, 20 which participate in the time function/synchronisation. Network 40 may use a packet-based transport mechanism (e.g. Internet Protocol, IP), a frame-based transport mechanism (e.g. Ethernet) or some other type of protocol data unit (PDU). The generalized term "protocol data unit" will be used in this disclosure to encompass packets, frames or other forms of PDU. Network 40 may use a combination of PDU formats, such as IP over Ethernet or Ethernet over IP. For an example of a wireless network, node 20 may use the network 40 as a backhaul network. Typically, the network 40 is used by other nodes (not shown). Traffic load on the network 40 can vary with time.

Node 10 and node 20 communicate with each other to allow the slave 20 to determine a time offset between itself and the master. By knowing this offset, the slave can synchronise itself with the master. The term "time function protocol data unit" is used in this disclosure to mean a protocol data unit (PDU) which is sent or received by a node as part of a time protocol. For example, the time function may be a synchronisation protocol based on the two-way exchange of messages. In the following disclosure, PTP will be used as an example time protocol, without limitation to this particular protocol. An example of a time function protocol data unit 52 is a PDU which carries an event message, e.g. a PTP event message, such as Sync and Delay_Req. The PTP event messages are delay-sensitive because their time of transmission by one of the PTP nodes (e.g. master) and their time of receipt by another of the PTP nodes (e.g. slave) directly affects the accuracy of the clock which is recovered from them.

In operation, node 10 sends PTP event messages 52 to node 20. This will be called the forward direction. Node 20 sends PTP event messages 52 to node 10. This will be called the reverse direction. Apparatus 12 at node 10 is configured to generate and send PDUs in the forward direction and to receive PDUs in the reverse direction. Apparatus 22 at node 20 is configured to receive PDUs in the forward direction and to generate and send PDUs in the reverse direction. The slave can establish frequency/phase/time synchronisation with the master. This means that a clock at the slave has the same frequency/phase/time as the clock at the master.

Figure 2:
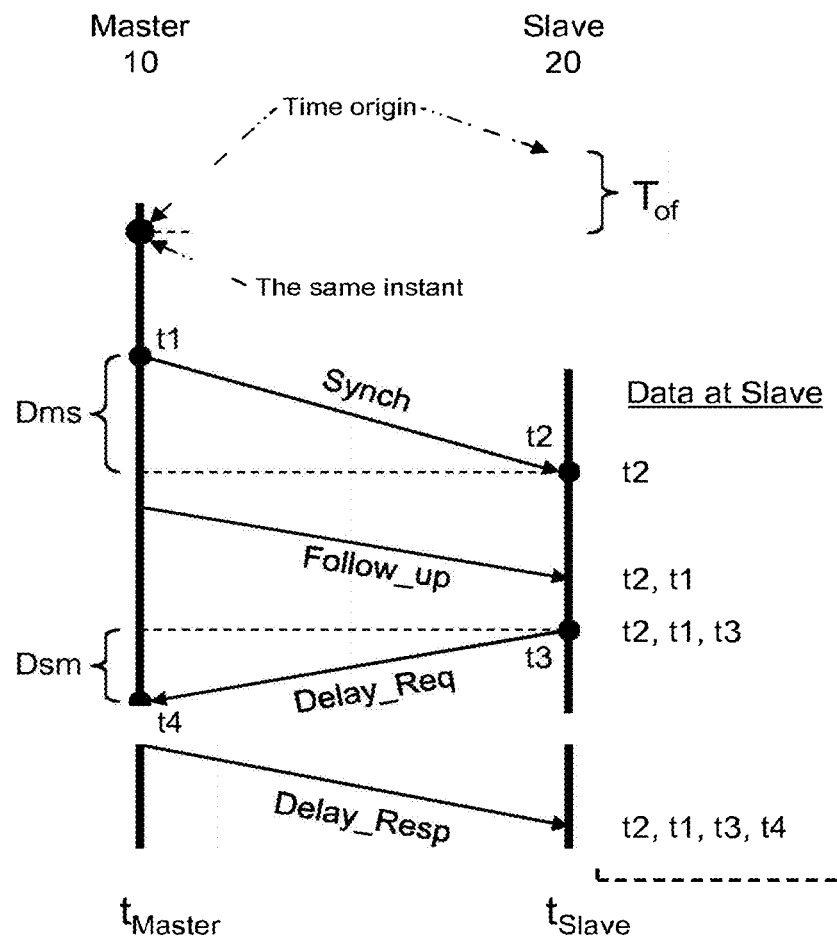
FIG. 2 shows messages between a master and a slave using the Precision Time Protocol.

Before describing further examples, FIG. 2 shows an overview of PTP (IEEE 1588v2). The purpose of the protocol is to synchronise the clock at the slave 20 with the clock at the master 10. A sequence of messages is transmitted between the master 10 and the slave 20. Initially there is an unknown time offset $T_{of}$ between the master 10 and the slave 20. At this time:

$$t_{slave} = t_{master} + T_{of}$$

The master sends a Synch message at time t1. The slave 20 receives the Synch message and records the time of arrival (t2) using the local clock at the slave. The master sends a Follow_up message. The Follow_up message carries a timestamp of the time t1 at which the Synch message was sent from the master. At this point the slave 20 knows:

$$t2-t1 = Dms + Tof \quad (1)$$

where Dms is the propagation delay between the master and the slave.

The slave 20 sends a Delay_Req message to the master 10 and records the time of departure (t3) of this message using the local clock at the slave. The Delay_Req message is received by the master at time t4. The master sends a Delay_Resp message to the slave. The Delay_resp message carries a timestamp of the time t4 at which the Delay_Req message was received at the master. At this point the slave 20 knows:

$$t2-t1 = Dms + Tof \quad (1)$$

$$t4-t3 = Dsm - Tof \quad (2)$$

where Dsm is the propagation delay between the slave and the master.

By combining (1) and (2) the slave can determine:

$$T_{of} = (t2-t1-t4+t3)/2 + (Dsm-Dms)/2$$

If it is possible to assume Dms=Dsm then it is possible to exactly compute $T_{of}$. In this process the PTP messages Synch and Delay_Req are the messages which are delay-sensitive. This is because the slave 20 uses Synch to determine time t2, and the master uses Delay_Req to determine time t4. These are called "event" messages by the IEEE 1588 standard. The Follow_up message carries a timestamp value recorded by the master. Similarly, the Delay_Resp message carries a timestamp value recorded by the master. The Follow_Up and Delay_Req messages are not delay-sensitive, and are called "general" messages by IEEE 1588.

International Telecommunications Union (ITU-T) is standardising a set of different PTP profiles. One of the scenarios under ITU-T standardisation is the case where a base station requires time synchronisation and the PTP packets shall cross some nodes not supporting any PTP function. This is the application addressed by the recently approved G.8275.2 profile, and ITU-T has defined applications according to two possible cases:

Partial Timing Support (PTS): the PTP packets provide a time synchronisation reference to the RBS;

Assisted Partial Timing Support (APTS): in normal operating conditions a local GNSS source is the main time synchronisation reference of the RBS. The PTP packets have provide a frequency synchronisation reference to the RBS to improve its holdover during possible periods of GNSS outage. This is particularly useful with an RBS for a small cell, which is often equipped with a cheap crystal oscillator, not allowing good holdover performance. The current ITU-T profile for PTS/APTS (G.8275.2) only uses Sync and Delay_Req. Therefore, the following disclosure focusses on the Sync and Delay_Req event messages.

In examples of the present invention, node 10 sends a plurality of preamble protocol data units 51 before sending a delay-sensitive time function protocol data unit 52. As explained above, some types of time function PDU 52 are delay-sensitive, as one of the time-support nodes 10, 20 will record a time of arrival of the PDU.

Figure 3:
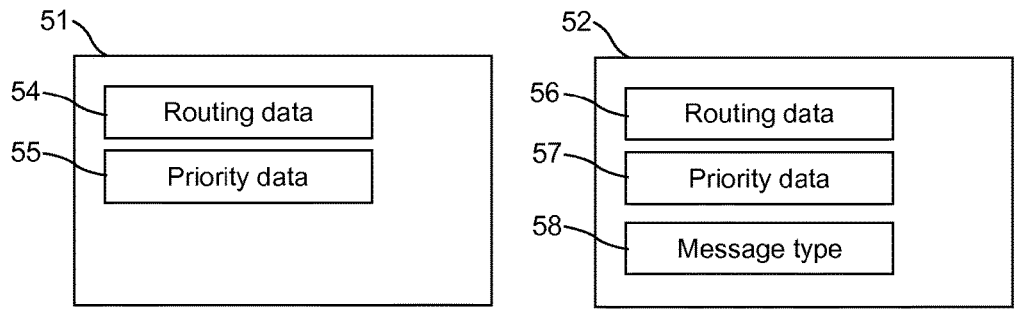
FIG. 3 shows time function PDUs and preamble PDUs.

FIG. 3 shows an example of a preamble PDU 51 and a time function PDU 52. The time function PDU 52 comprises routing data (e.g. an IP source address and an IP destination address). The time function PDU 52 may also comprise priority information (or priority data) 57. The priority information indicates a priority of the PDU, and can be used by nodes along a path through the network to prioritise the PDU compared to other PDUs. An example of priority information is a Differentiated Services Code Point (DSCP) value carried in a header of an IP packet. Other types of priority information are possible. The time function PDU 52 comprises an identifier of the message type, e.g. indicating that the message is a PTP Sync message or a PTP Delay_Req message. The preamble PDU 51 comprises routing data 54. The routing data 54 is the same, or similar to, routing data 56. The routing data 54 causes the preamble PDU 51 to follow the same network path as the time function PDU 52. The preamble PDU 51 may also comprise priority information 55. The priority information 57 of the preamble PDU 51 may have a priority level which is immediately below a priority level of the time function PDU 52. The preamble PDU 51 may comprise an identifier of the message type, e.g. indicating that the message is a preamble PDU, or the preamble PDU 51 may only carry priority information 55. The preamble PDU 51 may have a length which is a minimum PDU size allowed in the network 40. Other sizes are possible. In some examples, a combined length (53, FIG. 1) of the generated preamble PDUs 51 is equal to, or longer than, a maximum PDU size allowed in the network.

Figure 4:
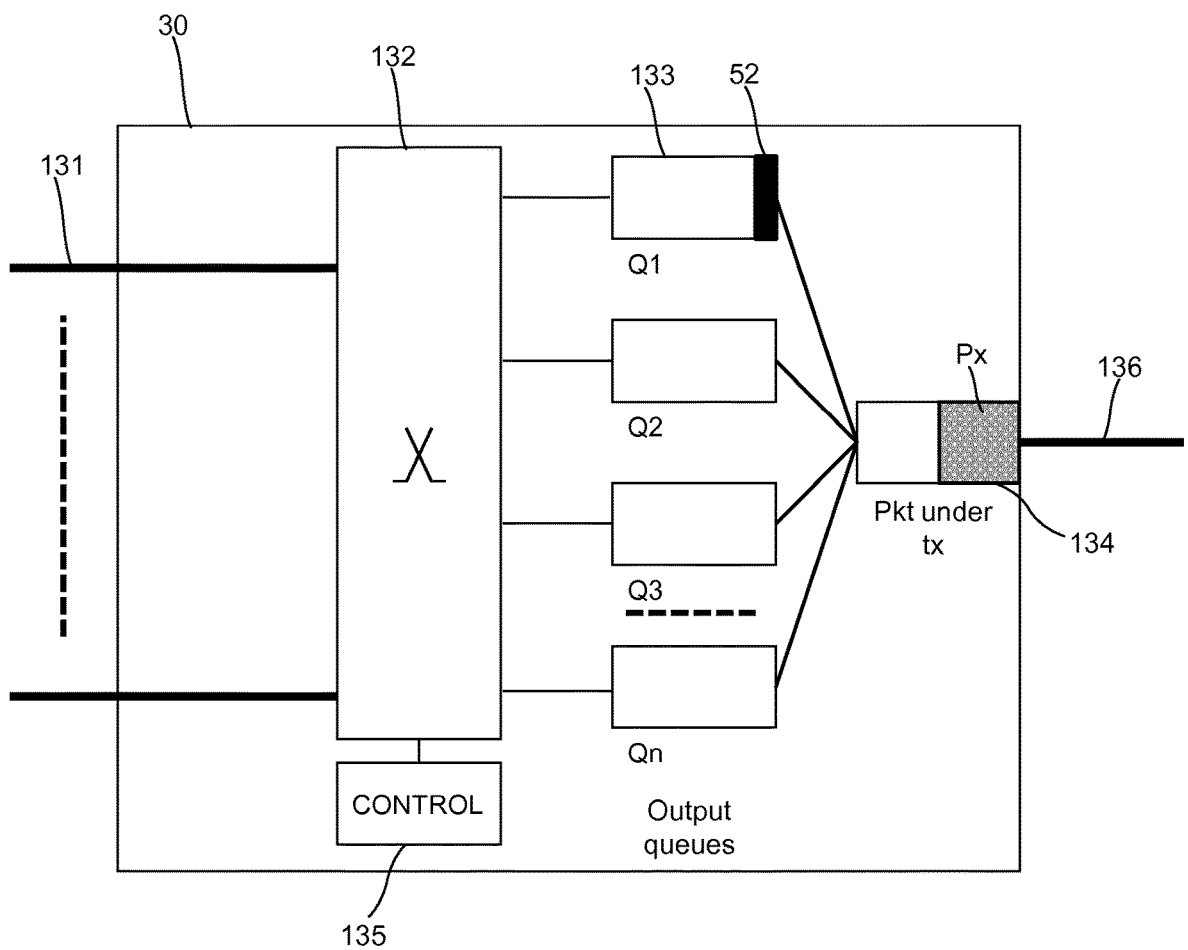
FIG. 4 shows a node in the network of FIG. 1.

FIG. 4 shows one of the nodes 30 of network 40. The node 30 comprises input ports 131, a switch 132, a plurality of output queues 133, Q1-Qn, an output buffer 134, and an output port 136. A controller 135 controls operation of the node 30. The controller 135 selects an output queue based on priority level of a PDU. For example, PDUs with the highest priority level are placed into queue Q1, PDUs with the second highest priority level are placed into queue Q2, and so on. The output buffer 134 contains just the PDU under transmission. When a time function PDU passes through node 30 it experiences a variable waiting time. This is packet delay variation (PDV). The variable amount of this waiting time is essentially due to the variable delay experienced by the PDU when placed in the output queue and waiting for being selected and placed in the output buffer 134. The amount of waiting time can be reduced by assigning time function PDUs the highest priority level. This means that nodes 30 will select for transmission the time function PDUs in preference to all other traffic, as it is assumed that only the time function PDUs has the highest priority. However, when a time function PDU arrives at a node 30 and is forwarded to the highest priority output queue Q1, the output buffer 134 may already be occupied by a generic traffic PDU, called Px. The time function PDU 52 cannot be transmitted until the transmission of Px is finished. This causes a variable amount of waiting time at the node 30. This will be repeated at each node 30 between node 10 and node 20 on the forward path. A similar process will occur on the reverse path between node 20 and node 10. There are various ways of implementing the set of queues Q1-Qn. In one example each of the queues may be implemented as a separate physical store. In another example the set of queues may be implemented as virtual queues which share the same physical store and the controller 135 can control which stored data relates to which virtual queue.

In the node of FIG. 4, the time function PDU 52 will experience a delay of Bx/R, where: R is the bit rate (bits per second) of the line; and Bx is the number of bits of the PDU Px still to be transmitted when the time function PDU 52 is queued. Therefore, if the longest packet which can cross this node has a length of Bmax bits, the PDV experienced by a time function PDU when traversing this port will fall in the range {0; Dmax}, where Dmax=Bmax/R. For example, if the port is working at 1 Gbit/s and the port is enabled to transmit packet of up to 9216 bytes, the PDV for a time function PDU will fall in the range {0; ≈74 µs}, because Dmax=(9216*8/10$^9$)s≈74 µs.

In an embodiment, nodes 30 traversed by the time function PDU are configured in the following way:
  the highest priority queue Q1 is reserved for the time function PDUs 52 and the second highest priority queue Q2 is reserved for the preamble PDUs 51. This assumption may be slightly relaxed, as discussed later. Q1 and Q2 are scheduled with strict priority.
  other traffic types are mapped to Q3 and lower priority queues.

Figure 5:
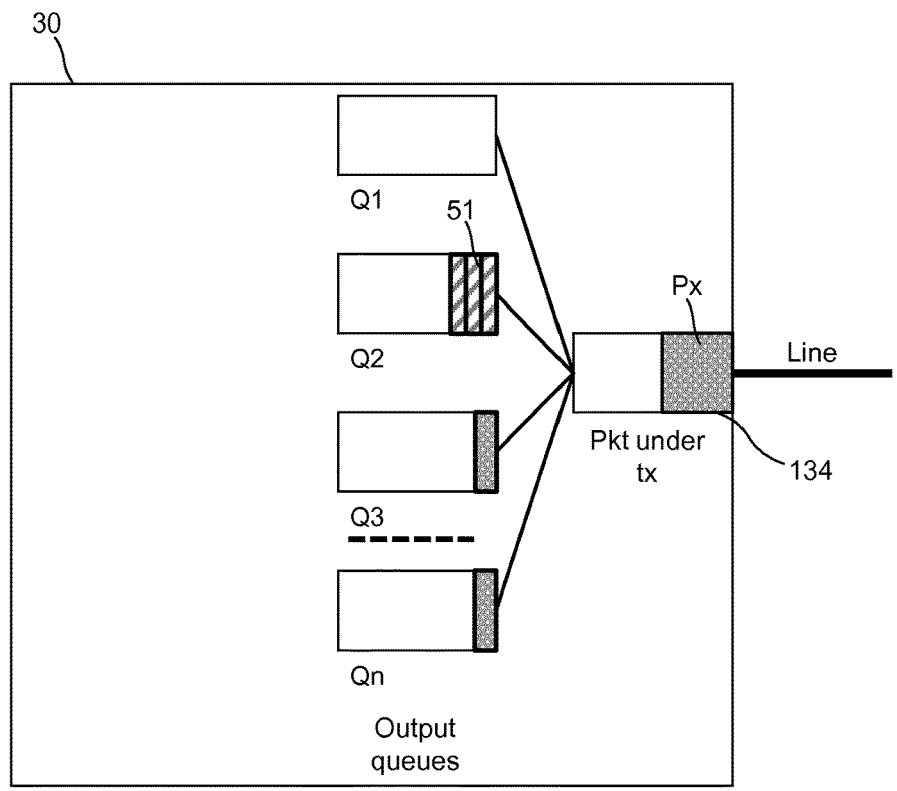
FIGS. 5 to 7 show the node of FIG. 3 over a period of time.
Figure 6:
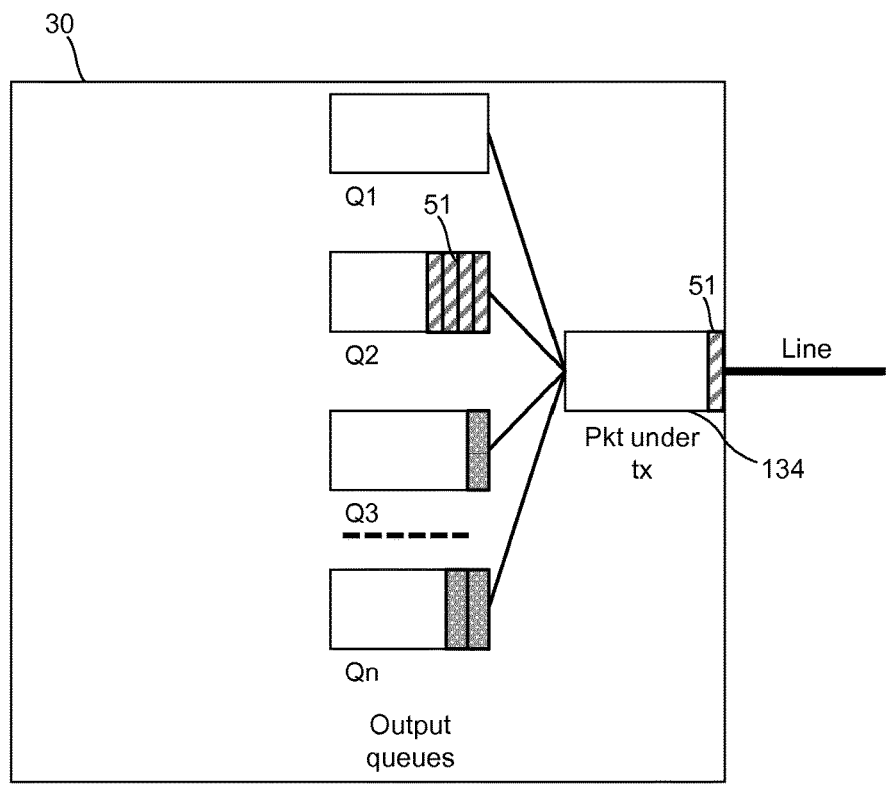
Figure 7:
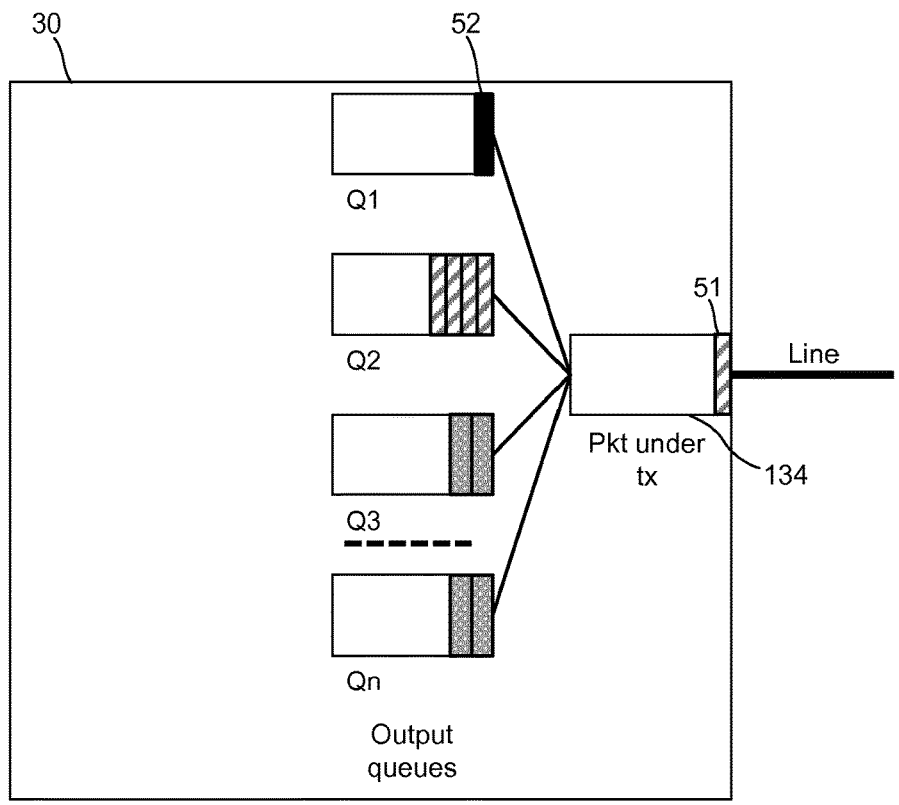

FIGS. 5 to 7 shows an example of operating node 30 over a period of time with preamble PDUs. In FIG. 5 the first preamble PDUs 51 have arrived at node 30. The preamble PDUs 51 are queued in queue Q2 because a generic traffic packet Px is already in the output buffer 134. In FIG. 6 the transmission of Px has completed. The node begins to transmit the preamble PDUs 51, as the preamble PDUs are the traffic with the highest priority level. At this time, queue Q1 is empty.

In FIG. 7 the time function PDU 52 has arrived at node 30 and has been forwarded to the highest-priority level output queue Q1. There is currently a preamble PDU 51 in the output buffer. When the current preamble PDU 51 in the output buffer has been transmitted, the node will forward the time function PDU 52 to the output buffer for transmission. It can be seen that the time function PDU 52 is only delayed by the time required to complete the transmission of the current preamble PDU 51. The preamble PDUs 51 can have the minimum allowed PDU size. For example, on an Ethernet line a length of 84 bytes: 12 bytes for the interpacket gap, 8 bytes for the Ethernet Preamble and the Start of Frame Delimiter (SoFD) and 64 bytes for the Ethernet minimum frame.

From this example, it can be seen that the preamble PDUs packets occupy, or reserve, a place in the transmission queues until the time function PDU arrives. The preamble PDUs can be discarded by the slave node 20 in the forward direction (e.g. preamble PDUs preceding a PTP Sync packet), or by the master node 10 in the reverse direction (e.g. preamble PDUs preceding a PTP Delay_Req packet).

Any sort of "dummy" PDUs, having the minimum length, can be used as preamble PDUs. These dummy PDUs are discarded by the PTP supporting node without any need of modification to the normal behaviour of network nodes.

ITU-T G.8275.2N.1369.2 (06/2016) has standardised a PTS/APTS profile with PTP mapped over UDP/IPv4/Eth. An example of a suitable preamble PDU is a null UDP (UDP/IPv4/Ethernet) packet, carrying the same IP destination address and IP source address as the relevant PTP event PDU. For example, if the node 30 provides QoS based on DSCP values of the IP packets, a possible configuration is: IP packets transporting the PTP PDU have DSCP=54; the preamble PDU have DSCP=48; all the other traffic types have DSCP<48; Q1 is reserved to packets with DSCP=54 and Q2 is reserved to packets with DSCP=48.

Consider that the network path between nodes 10, 20 has a single node 30 to be traversed. In this case, the total length of the preamble PDUs 51 transmitted just before each time function PDU 52 is configured to be equal to, or (slightly) longer than, a maximum PDU size allowed in the network. For example, if the maximum size of a PDU allowed in the network is 9216 bytes, and each preamble PDU has the minimum allowable size of 84 bytes, the number of preamble PDUs can be configured as 110, because 110*84 bytes=9240 bytes, where 9240 bytes>9216 bytes. Referring again to FIG. 5, a worst case scenario is where the first preamble PDU 51 starts to be queued at node 30 just as the node starts transmitting a traffic PDU of the largest allowed size from output buffer 134. By filling the queues at a node 30 with preamble PDUs, the only high-priority traffic ahead of the time function PDU is the set of preamble PDUs. Because the node 30 selects between traffic according to priority, the preamble PDUs will have a higher priority than other traffic, and will prevent other traffic from occupying the output buffer 134. However, when the time function PDU arrives at node 30, the time function PDU has a higher priority than any other traffic. As the only traffic in the output buffer 134 is one preamble PDU, the time function PDU 52 will be delayed by (at most) just one preamble PDU 51.

Some numerical examples will now be provided to illustrate an advantage of using the preamble PDUs.

Consider an Ethernet line, with the length of the preamble PDUs=84*8 bits (=672 bits); then the time function PDU delay lies within the range {0; 672/R}, where R is the line speed in bits per second. For example, with a port working at 1 Gbit/s, this range is {0; 672 ns}, which greatly reduces the average PDV.

Consider Bx is the average length (number of bits) of a generic traffic packet Px which can delay a time function PDU. It can be assumed the PDV experienced by a time function PDU is uniformly distributed in the range {0; Dx}, where Dx=Bx/R. With an average traffic packet of 1000 bytes and a 1 GE line, the PDV can be assumed to be uniformly distributed in the range {0; 8000n5}.

Consider the following case:
  A line working at 1GE;
  A PTP algorithm which takes into account only the Sync PTP packets (i.e. a one-way PTP application, but this can also be applied to two-way applications).
  A typical PTP algorithm which takes into account the 1-percentile (with the minimum delay) of the received Sync packets.

Given that, after the 1-percentile packet filtering, the PDV will be, on the average, less than: 8000 ns/100=80 ns. By using preamble PDUs, the PDV is: 672 ns/100=6,7 ns. Therefore, there is a PDV reduction of 92%.
In case of two-way PTP, an additional advantage is that the PDV experienced by the time function PDUs in the two directions becomes statistically symmetric, independently of the possible asymmetries between the traffic load of the two directions.

A path between a master node 10 and a slave node 20 will typically comprise a plurality of intermediate nodes 30. Consider that a time function PDU has to traverse N intermediate nodes. In a worst case scenario, the time function PDU will be delayed by N maximum length PDUs. The number of preamble PDUs 51 can be selected based on the number of intermediate nodes 30 to be traversed. For example, with N intermediate nodes the sending node generates a number of preamble protocol data units such that a combined length of the generated preamble protocol data units is equal to, or greater than, a length of N times the maximum protocol data unit size allowed in the network.

Figure 8:
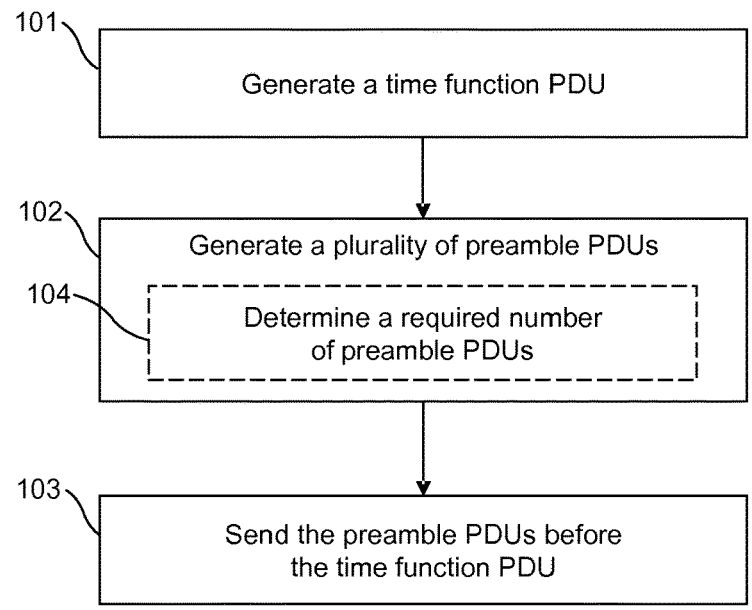
FIG. 8 shows a method performed at a first time function node.

FIG. 8 shows an example method performed by a node to support a time function. The node can be the master node 10 or the slave node 20. At block 101 the node generates a time function protocol data unit required for supporting the time function. At block 102 the node generates a plurality of preamble protocol data units. At block 103 the node sends the plurality of preamble protocol data units before sending the time function protocol data unit.

Optionally, at block 104 the node may determine a number N of network nodes to be traversed between the first time node and a second first time node and the generating, at block 102, can generate a number of preamble protocol data units based on the number N. The node may store a look-up table with a plurality of entries, each entry comprising a value of N and a number of preamble PDUs for that value of N, e.g. N=2 corresponds to xx preamble PDUs, N=3 corresponds to yy preamble PDUs, and so on. The number N may be configured in advance.

Figure 9:
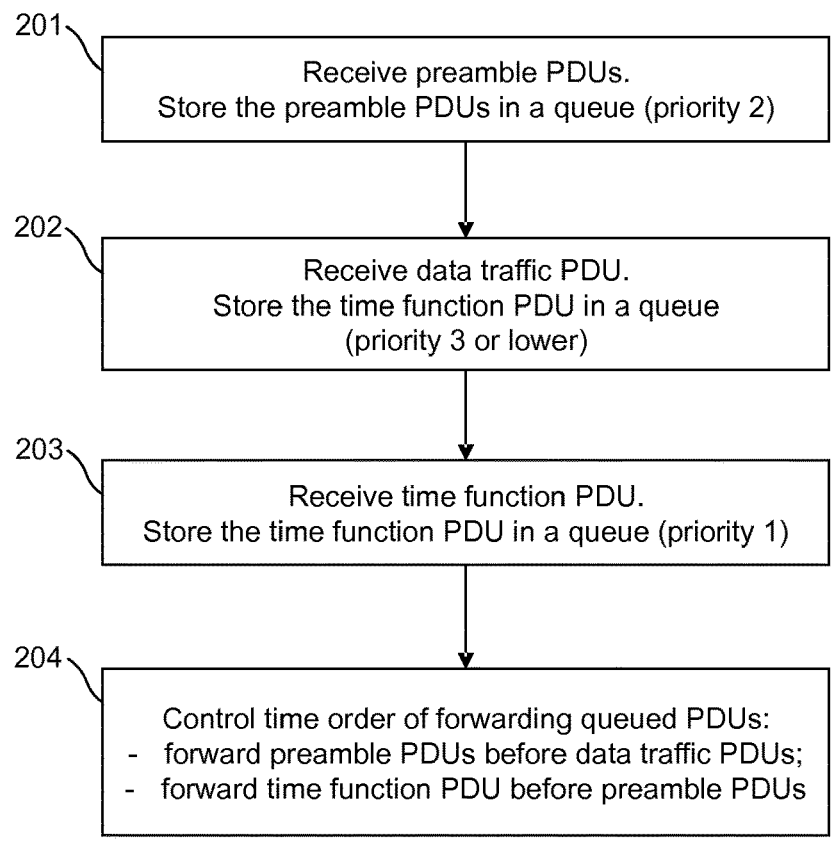
FIG. 9 shows a method performed at an intermediate node of a network.

FIG. 9 shows an example method performed by an intermediate node 30 of the network 40. At block 201 the node receives a plurality of preamble PDUs and stores the plurality of preamble PDUs in a second queue having a second priority level. At block 202 the node receives a data traffic PDU carrying data traffic and stores the data traffic PDU in a third queue having a third priority level which is lower than the second priority level.

At block 203 the node receives a time function PDU required for supporting a time function. The node stores the time function PDU in a first queue having a first priority level. The first priority level is higher than the second priority level and the third priority level. The plurality of preamble PDUs are received before the time function PDU. Each of the preamble PDUs is shorter than a maximum PDU size allowed in the network. The preamble PDUs carry routing information to cause the preamble PDUs to follow the same network path as the time function PDU.

At block 204 the node controls the time order of forwarding queued PDUs. The node controls a time order of forwarding queued protocol data units based on the priority levels of the queues. In an example the priority levels are configured as:
  priority level 1 (highest)—time function PDUs;
  priority level 2—preamble PDUs;
  priority level 3 (and lower)—other (general) data traffic.
The other data traffic may comprise wireless backhaul traffic to/from the wireless base station (25, FIG. 1).

The time order of forwarding is: forward preamble PDUs before forwarding the data traffic PDUs; forward a time function PDU before forwarding any remaining queued preamble PDUs. An effect of this time order of forwarding is that preamble PDUs occupy an output buffer until arrival of a time function PDU. When the time function PDU arrives at the intermediate node it is forwarded with minimal delay. This is because the output buffer will only be occupied by a preamble PDU of short length. The preamble PDUs serve a place holding function at the intermediate node(s) and any preamble PDUs remaining in the queue yield to the time function PDU. The time function PDU may experience a maximum waiting time of the length of one preamble PDU as shown in the examples of FIGS. 5 to 7.

Alternatively or in addition, the time function PDU may be considered as forwarded directly following forwarding at least one of the queued preamble PDUs. The functionality at node 30 may be implemented by configuring a controller of the node to sort PDUs according to priority level.

The intermediate node 30 can allocate arriving PDUs to queues according to values of priority information carried in the PDUs, such as a priority field in a header of the PDUs (e.g. a DSCP field in an IP packet). Additionally or alternatively, the intermediate node 30 can allocate arriving PDUs to queues according to another criterion or criteria. For example, the intermediate node 30 can determine a type of message carried by a PDU (e.g. preamble PDU, PTP Event message PDU, data traffic PDU) and can allocate arriving PDUs to queues according to the type of message. For example, the intermediate node 30 stores data which causes the node to: map PDUs carrying a PTP Event message to the highest priority queue Q1; map preamble PDUs to the second highest priority queue Q2; map PDUs containing other type of data traffic to lower priority queue(s), and so on.

Figure 10:
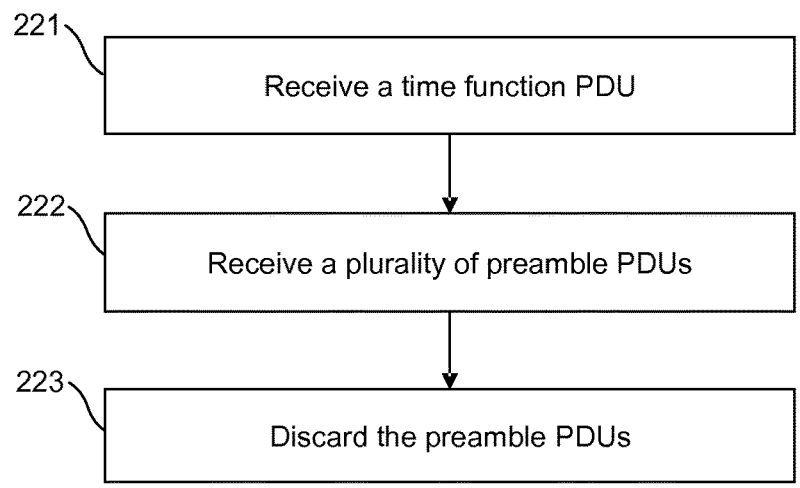
FIG. 10 shows a method performed at a second time function node.

FIG. 10 shows an example method performed by a node to support a time function. The node can be the master node 10 or the slave node 20. At block 221 the node receives a time function PDU. At block 222 the node receives a plurality of preamble PDUs. At block 223 the node discards the plurality of preamble PDUs.

Figure 11:
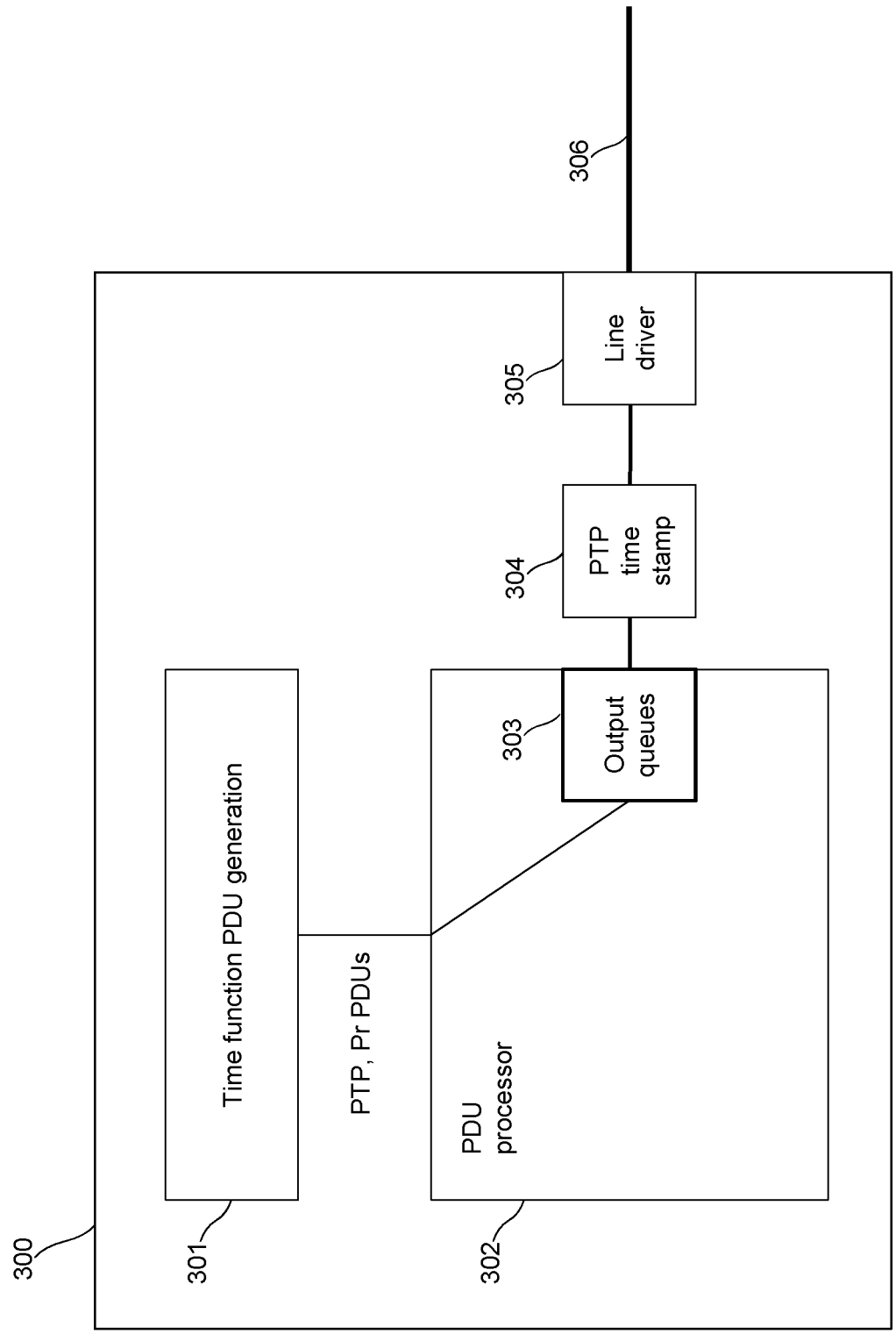
FIG. 11 shows apparatus at a first node of a network.
Figure 12:
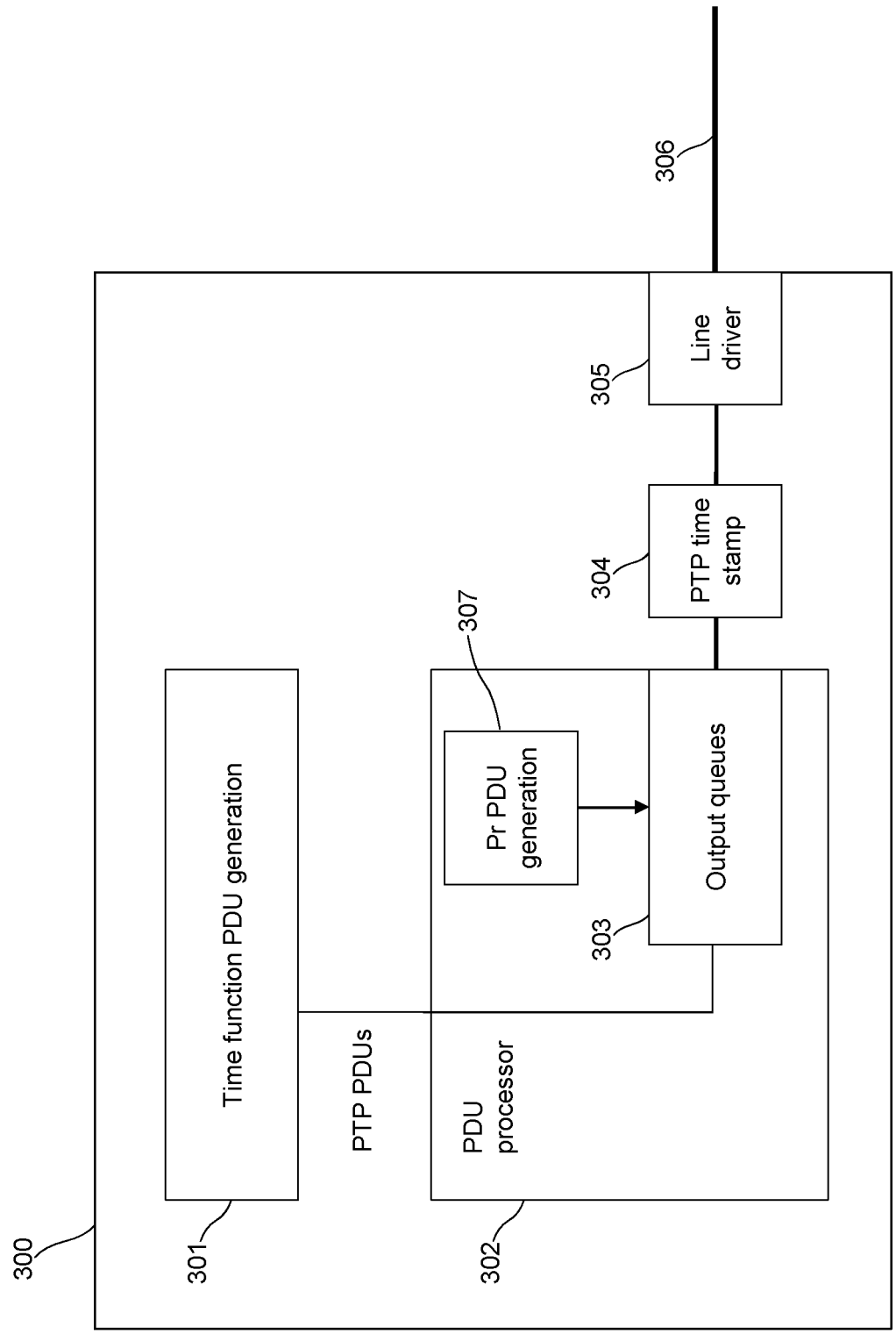
FIG. 12 shows apparatus at a second node of a network.

FIGS. 11 and 12 show two examples of apparatus 300 at one of the nodes 10, 20 which support a time synchronisation function. The examples differ in where the preamble PDUs are generated. In FIG. 11 a time function (e.g. PTP application) 301 generates time function PDUs, such as packets which carry PTP event messages. The same block 301 also generates the preamble PDUs. Block 301 may be implemented as a software application executed by a processor. Time function PDUs and preamble PDUs are forwarded to a PDU processor 302. The PDU processor 302 controls a transmission order of the PDUs. Preamble PDUs are output before a time function PDU. The PDU processor ensures that PDUs carrying other traffic are not interleaved between consecutive preamble PDUs. A timestamp function 304 records a timestamp of certain time function PDUs, as explained above in connection with FIG. 10. The timestamp value may be sent within either the same time function PDU (one-step clock according to the IEEE 1588 terminology) or a subsequent time function PDU (two-step clock behavior). For example, master node 10 records a timestamp (time t1) when sending a Synch message and sends the t1 value within either the same Sync message or a Follow_up message. PDUs are output to a line driver 305 and onto a line 306.

The apparatus of FIG. 12 is similar to FIG. 11. The main difference is that preamble PDUs are generated by a block 307 within the PDU processor 302. The PDU processor detects when a delay-sensitive time function PDU (e.g. PTP event message) is queued. The PDU processor generates preamble PDUs and inserts them in output queue Q2 (i.e. second priority level). The PDU processor delays the transmission of delay-sensitive time function PDU until a required number of preamble PDUs have been sent. The delay is not important because the timestamp is only recorded when the PTP event PDU is sent.

While the method does require additional dummy PDUs, the overhead is not significant. Consider a PTS/APTS protocol uses 32 event (Sync/Delay_Req) PDUs per second. With a maximum PDU size in the network of 9216 bytes and 4 intermediate nodes to be crossed, the overhead caused by the preamble PDUs is: 4*32*110*672 bit/s≈9.5 Mbit/s. This is about 0.9% of the capacity of a 1 GE link. The probability of a time function PDU being delayed by N maximum length PDUs is low. The number of preamble PDUs may be reduced without a significant impact on synchronisation performance.

In the example described above the output queues Q1 and Q2 are reserved exclusively for time function PDUs and preamble PDUs. In other examples, it is possible that nodes in the network may send other high priority traffic which is mapped to the queues Q1, Q2.

While examples have been described with reference to PTP, another possible time function is Network Time Protocol (NTP).

The steps of the methods described herein may be carried out in any suitable order, or simultaneously where appropriate.

Figure 13:
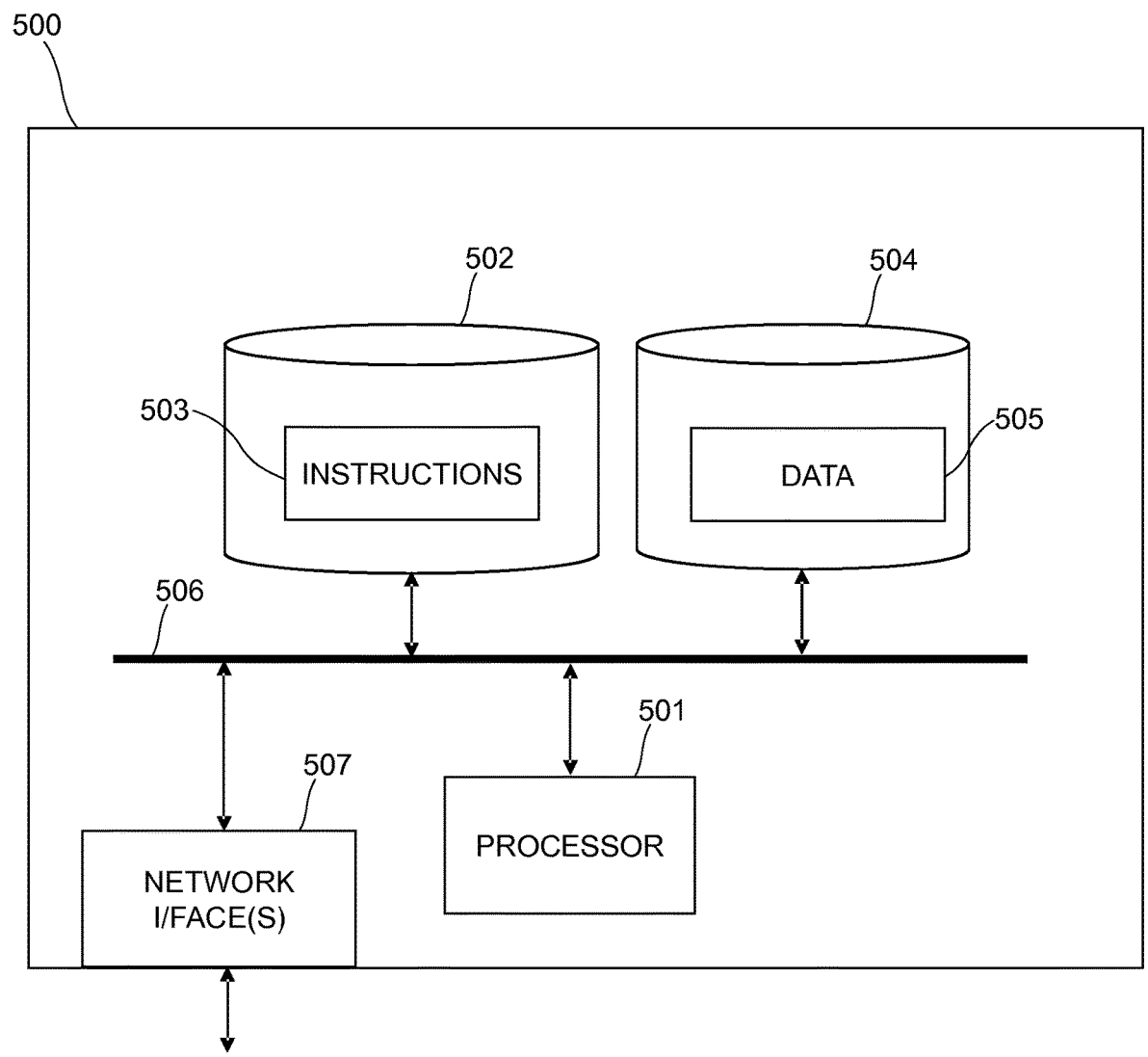
FIG. 13 shows apparatus for a computer-based implementation.

FIG. 13 shows an example of processing apparatus 500 which may be implemented as any form of a computing and/or electronic device, and in which embodiments of the system and methods described above may be implemented. Processing apparatus may implement all, or part of, the method shown in FIG. 7 or 8, or described or shown in earlier Figures. The processing apparatus may be considered as a part of, or a controller for, a node 10; 20; 30.

Processing apparatus 500 comprises one or more processors 501 which may be microprocessors, controllers or any other suitable type of processors for executing instructions to control the operation of the device. The one or more processors 501 may be considered as processing circuitry. The processor 501 is connected to other components of the device via one or more buses 506. Processor-executable instructions 503 may be provided using any computer-readable media, such as memory 502. The processor-executable instructions 503 can comprise instructions for implementing the functionality of the described methods. The memory 502 is of any suitable type such as read-only memory (ROM), random access memory (RAM), a storage device of any type such as a magnetic or optical storage device. Additional memory 504 can be provided to store data 505 used by the processor 401. The processing apparatus 500 comprises one or more network interfaces 408 for interfacing with other network entities. The processing apparatus 500 is configured to control, e.g. initiate or cause and/or implement any part of the function or method described.

The steps of the methods described herein may be carried out in any suitable order, or simultaneously where appropriate. Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a first node of a network to provide a time function in the network, the method comprising, at the first node:
   generating a time function protocol data unit for supporting the time function;
   generating a plurality of preamble protocol data units;
   sending the plurality of preamble protocol data units to a second node via a network path before sending the time function protocol data unit; and
   sending the time function protocol data unit to the second node via the same network path,
   wherein the plurality of preamble protocol data units carry routing information to cause the plurality of preamble protocol data units to follow the same network path as the time function protocol data unit,
   wherein the time function protocol data unit carries information causing any intermediate node on the same network path to forward the time function protocol data unit before forwarding any remaining of the plurality of preamble protocol data units, and
   wherein the time function protocol data unit carries an event message of a synchronisation protocol using a two-way exchange of messages.

2. A method according to claim 1, wherein the preamble protocol data units carry information configured to indicate to the intermediate node to forward the preamble protocol data units before other data traffic.

3. A method according to claim 1, wherein the preamble protocol data units and the time function protocol data unit carry priority information which indicates a priority level, wherein the priority level of the preamble protocol data units is below the priority level of the time function protocol data unit.

4. A method according to claim 3, wherein the priority level of the preamble protocol data units is immediately below the priority level of the time function protocol data unit.

5. A method according to claim 3, wherein the priority level of the time function protocol data unit and the priority level of the preamble protocol data unit are higher than a priority level of other data traffic in the network.

6. A method according to claim 1 wherein the network permits a maximum protocol data unit size and a length of the preamble protocol data units is less than 5% of the maximum protocol data unit size.

7. A method according to claim 1 wherein the preamble protocol data unit has a length which is a minimum protocol data unit size permitted in the network.

8. A method according to claim 1 wherein the network supports a maximum protocol data unit size and a combined length of a sequence of the plurality of preamble protocol data units is equal to, or longer than, the maximum protocol data unit size.

9. A method according to claim 1 comprising:
   determining when the time function protocol data unit is waiting in a queue at the first node; and
   generating a sequence of the plurality of preamble protocol data units and inserting the sequence of the plurality of preamble protocol data units into a transmission queue before the time function protocol data unit is inserted into the transmission queue.

10. A method according to claim 1, wherein the generating the plurality of preamble protocol data units comprises determining a number of preamble protocol data units based on a number of intermediate nodes to be traversed between the first node and the second node.

11. A method according to claim 1, wherein the generating of the plurality of preamble protocol data units comprises generating a number of preamble protocol data units such that a combined length of a sequence of the plurality of preamble protocol data units is equal to, or greater than, a length of a multiple of a maximum protocol data unit size allowed in the network.

12. A method according to claim 1 comprising:
recording a timestamp of a transmission time of the time function protocol data unit; and
sending the timestamp in a subsequent time function protocol data unit.

13. A method according to claim 1 wherein the time function is one of: Precision Time Protocol and Network Time Protocol.

14. A method according to claim 13 wherein the time function protocol data unit carries a Precision Time Protocol Synch message or a Precision Time Protocol Delay Request message.

15. A method according to claim 1 comprising, at an intermediate node along the network path:
receiving the plurality of preamble protocol data units and storing the plurality of preamble protocol data units in a second queue having a second priority level;
receiving the time function protocol data unit and storing the time function protocol data unit in a first queue having a first priority level which is higher than the second priority level, wherein the plurality of preamble protocol data units are received before the time function protocol data unit, and
controlling a time order of forwarding, by the intermediate node, queued protocol data units based on the priority levels of the queues.

16. A method according to claim 15 wherein the controlling a time order of forwarding comprises forwarding the queued time function protocol data unit before forwarding any remaining queued preamble protocol data units.

17. A method according to claim 15 comprising:
receiving a data traffic protocol data unit carrying data traffic and storing the data traffic protocol data unit in a third queue having a third priority level which is lower than the second priority level; and
the controlling a time order of forwarding comprises:
forwarding, by the intermediate node, the queued preamble protocol data units before forwarding the queued data traffic protocol data unit; and
forwarding, by the intermediate node, the time function protocol data unit before forwarding any remaining queued preamble protocol data units.

18. A method according to claim 15 wherein the intermediate node allocates at least one of the preamble protocol data units to a queue according to at least one of:
priority information carried by the protocol data unit;
an indicator of a message type.

19. An apparatus for supporting a time function in a network, the apparatus configured to:
generate a time function protocol data unit for supporting the time function;
generate a plurality of preamble protocol data units;
send the plurality of preamble protocol data units to a destination node via a network path before sending the time function protocol data unit; and
send the time function protocol data unit to the destination node via the same network path,
wherein the preamble protocol data units carry routing information to cause the preamble protocol data units to follow the same network path as the time function protocol data unit,
wherein the time function protocol data unit carries information causing any intermediate node on the same network path to forward the time function protocol data unit before forwarding any remaining of the preamble protocol data units, and
wherein the time function protocol data unit carries an event message of a synchronisation protocol using a two-way exchange of messages.

20. A system comprising:
a first node and a first clock, wherein the first node is configured to:
generate a time function protocol data unit for supporting the time function,
generate a plurality of preamble protocol data units,
send the plurality of preamble protocol data units to a second node via a network path before sending the time function protocol data unit, and
send the time function protocol data unit to the second node via the same network path,
wherein the time function protocol data unit carries information causing any intermediate node on the same network path to forward the time function protocol data unit before forwarding any remaining of the preamble protocol data units, and
wherein the plurality of preamble protocol data units carry information causing the intermediate node to forward the plurality of preamble protocol data units before other data traffic;
the second node comprising a second clock;
the same network path connecting the first node to the second node, the same network path comprising at least one intermediate node,
wherein the second node is configured to:
receive the time function protocol data unit,
use the time function protocol data unit to determine a time offset between the second clock and a clock at the first node, and
synchronise the second clock with the first clock.

21. A system according to claim 20 wherein the at least one intermediate node comprises another apparatus configured to:
receive a plurality of preamble protocol data units and store the plurality of preamble protocol data units in a second queue having a second priority level;
receive a time function protocol data unit for supporting a time function and store the time function protocol data unit in a first queue having a first priority level which is higher than the second priority level, wherein the plurality of preamble protocol data units are received before the time function protocol data unit; and
control a time order of forwarding, by the intermediate node, queued protocol data units based on the priority levels of the queues.

22. A system according to claim 20 wherein the network is a wireless backhaul network and the second node is a wireless base station.

23. An apparatus for supporting a time function in a network, the apparatus comprising a processor and a memory, the memory containing instructions that when executed by the processor cause the processor to:

generate a time function protocol data unit for supporting the time function;

generate a plurality of preamble protocol data units;

control sending the plurality of preamble protocol data units to a destination node via a network path before sending the time function protocol data unit; and control sending the time function protocol data unit to the destination node via the same network path, wherein the plurality of preamble protocol data units carry routing information to cause the plurality of preamble protocol data units to follow the same network path as the time function protocol data unit, wherein the time function protocol data unit carries information causing any intermediate node on the same network path to forward the time function protocol data unit before forwarding any remaining of the plurality of preamble protocol data units, and wherein the time function protocol data unit carries an event message of a synchronisation protocol using a two-way exchange of messages.

24. An apparatus for supporting a time function in a network, the apparatus comprising:

a first generation module configured to generate a time function protocol data unit required for supporting the time function;

a second generation module configured to generate a sequence of preamble protocol data units;

an output module configured to send the sequence of preamble protocol data units to a destination node via a network path before sending the time function protocol data unit; and the output module configured to send the time function protocol data unit to the destination node via the same network path, wherein the sequence of preamble protocol data units carry routing information to cause the sequence preamble protocol data units to follow the same network path as the time function protocol data unit, wherein the time function protocol data unit carries information causing any intermediate node on the same network path to forward the time function protocol data unit before forwarding any remaining of the sequence of preamble protocol data units,. and wherein the time function protocol data unit carries an event message of a synchronisation protocol using a two-way exchange of messages.

* * * * *